(12) United States Patent
Bunce et al.

(10) Patent No.: US 7,900,645 B2
(45) Date of Patent: Mar. 8, 2011

(54) CUSTOM CAMOUFLAGE COVERS AND PANELS

(76) Inventors: Thomas A. Bunce, Hesperia, MI (US); James S. Lombardi, Fenton, MI (US); Chris Allen Lewis, Linden, MI (US)

( * ) Notice: Subject to any disclaimer, the term of this patent is extended or adjusted under 35 U.S.C. 154(b) by 0 days.

(21) Appl. No.: 12/287,076

(22) Filed: Oct. 6, 2008

(65) Prior Publication Data
US 2009/0100736 A1 Apr. 23, 2009

Related U.S. Application Data

(60) Provisional application No. 60/997,827, filed on Oct. 5, 2007.

(51) Int. Cl.
*E04H 15/54* (2006.01)
(52) U.S. Cl. ............................... 135/115; 135/901

(58) Field of Classification Search .................. 135/901, 135/115, 905; 43/1
See application file for complete search history.

(56) References Cited

U.S. PATENT DOCUMENTS

| 5,477,875 | A  | * | 12/1995 | Daly, Jr. | 135/95 |
| 6,202,666 | B1 | * | 3/2001  | Rehbein   | 135/115 |
| 6,408,865 | B1 | * | 6/2002  | Bliss     | 135/118 |
| 7,568,492 | B1 | * | 8/2009  | Helmer    | 135/117 |

* cited by examiner

*Primary Examiner* — David Dunn
*Assistant Examiner* — Danielle Jackson

(57) ABSTRACT

Digital photography and a dye-sublimation process are used to generate and affix, in sequence, each of a succession of photographs of a particular environment onto one or more fabric panels that form a camouflage hunting blind whereby the sequence of the photographs generate a 360° continuous panoramic view or realistic pattern that replicates the actual outdoor environment in which the blind is placed, such as a replication of the actual trees, bushes, and like foliage of the setting in which the blind is to be placed.

8 Claims, 2 Drawing Sheets

FIG 1
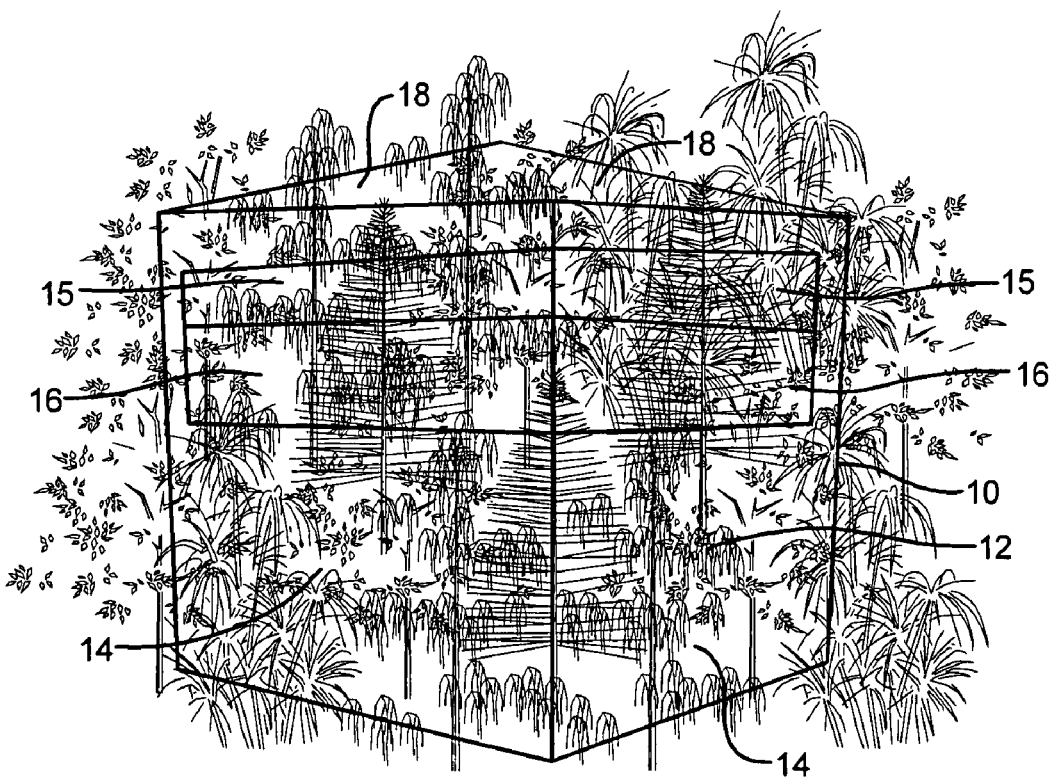
FIG 3

CUSTOM CAMOUFLAGE COVERS AND PANELS

CROSS-REFERENCE TO RELATED APPLICATIONS

This application is a completion application of and claims the benefit of U.S. Provisional Application No. 60/997,827, filed Oct. 5, 2007, the disclosure of which is hereby incorporated in its entirety.

BACKGROUND OF THE INVENTION

1. Field of the Invention

The present invention pertains to the field of portable and permanent enclosures, including for example, tents and hunting blinds and the like provided with camouflage to blend into the surrounding environment, and more particularly, to an enclosure comprised of a fabric material to which photographic images of the actual environment are printed and display a continuous facsimile of the actual environment that the enclosure is placed in a manner that the enclosure blends into and replicates the environment as seen by a viewer as if the enclosure were not there.

2. Description of the Prior Art

The use of tents or blinds to house or shelter an inhabitant, such as a hunter or nature observer, is known. Typically, the tent or blind is comprised of a suitable fabric, possibly water repellant, intended to be somewhat permanent or erected as a temporary structure, and adapted to enable ease of erection and tear down.

Additionally, the fabric is typically camouflaged such as by being dyed with splotches of green and brown and black and tan to make the blind hard to distinguish from the background or, as a minimum, of a color adapted to blend in with the surrounding environment. Typically, however, the shapes or splotches are somewhat general in nature and do not replicate any particular environment. Additionally, the colors may not be completely representative of the actual environment in which the blind is placed.

Various approaches and constructions of camouflaged tents, housings, blinds and the like and material therefor are to be found in the patent prior art, including U.S. Pat. No. 5,727,253, issued Mar. 17, 1998 to Wilkinson; U.S. Pat. No. 5,924,131, issued Jul. 20, 1999 to Wilkinson; U.S. Pat. No. 6,342,290, issued Jan. 29, 2002 to Conk; U.S. Pat. No. 6,682,879, issued Jan. 27, 2004 to Conk; U.S. Pat. No. 6,859,983, issued Mar. 1, 2005 to Curtis et al.; and U.S. Pat. No. 6,953,511, issued Oct. 11, 2005 to Bowles, Jr. et al; and U.S. Pat. Publications 2005/0005339, published Jan. 13, 2005 to Johnson; and 2005/0118402, published Jun. 2, 2005 to Henderson et. al. These patents are specifically incorporated herein by reference as regards the conventional approaches and constructions taught therein.

These prior art patents are so identified herein in recognition of a duty of disclosure of related subject matter, which may be relevant under 37 CFR 1.56.

There is an ongoing need for improvements in such blinds, tents, and like shelters and provision therefor of realistic camouflaging that replicates a continuous wide view of the actual environment in which the blind is erected.

SUMMARY OF THE INVENTION

This invention comprises the use of digital photography and a dye-sublimation process to generate and affix, in sequence, each of a succession of photographs of a particular environment onto one or more fabric panels that form a blind whereby the sequence of the photographs generate a 360° continuous panoramic view or realistic pattern that replicates the actual outdoor environment in which the blind is placed. The pattern is a replication of the actual trees, bushes, and like foliage of the setting in which the blind is to be placed and forms a camouflage.

In the practice of this invention multiple images are photographed of an actual eco-scene and the images combined to produce a panorama or larger image. In practicing the invention, a center or reference location of where the blind is to be placed is determined, the photographer moves from this reference location and takes photos looking at the reference and therearound, such as North, South, East, and West. Computer software is used to interpolate the final image where the component images are not in precise alignment.

More particularly, according to the present invention, there is provided a method of manufacturing a camouflage material for an enclosure to be located in any selected outdoor environment including but not limited to such environments as those formed by trees, bushes, underbrush, cornfields, cat tails and the like, comprising the steps of taking a series of digital photographs, the series of photographs forming a continuous 360° panoramic view about the location where the enclosure is to be placed and of the actual environment thereof, entering the digital photographs into a digital computer, and printing the images onto at least one sheet of material in a manner to form a continuous-tone image that looks like photographic film.

According to this method, the step of printing is by a dye sublimation process. In one preferred application, the material is a polyester fabric and dye from the sublimation process is impregnated into the material of the fabric. In other applications, polyester blends including cotton and other materials are contemplated.

In an aspect of this method, the material is selected from the group consisting of a polyester fabric, a polymer, a polymer-coated item, including natural fibers such as cotton and cotton blend fabrics, and materials having pores, such as canvas. Further, the finished material is coated to be water repellant and resistant to environmental attack.

In another preferred embodiment of this invention there is provided a hunting blind to camouflage persons present in a natural habitat comprised of various foliage, trees and landscape features, the hunting blind comprising a wall that forms a continuous outer surface and an enclosed interior, wherein the outer surface is provided with camouflage in the form of a panoramic photographic image of the actual habitat where the blind is to be located being printed on the outer surface, the image as would be seen by a viewer looking at the location of where the blind would be located and making a composite photographic image of the successive views.

In an important aspect, the photographic image represents the colors and textures corresponding to the various landscape features of the actual habitat and is applied by dye sublimation. The materials are as discussed above.

Additionally, the wall is formed by a succession of flat panels with each panel has a portion of the photographic image printed thereon. In an aspect, the panels form a four-sided enclosure, wherein the image is facing in four different orthogonal directions, and at least one panel has a reclosable opening to enable the user to view the habitat without being seen.

In another preferred embodiment according to this invention there is provided a hunting blind adapted to be located in a specific forest environment, the blind comprising an erectable knock-down skeletal frame, the frame defining a succession of vertical wall sections, and a camouflage cover comprised of a fabric or polymeric material and adapted to be disposed in covering relation with the wall sections, the cover being one piece and/or assembled from several panels, parts or pieces that are assembled to one another, and the camouflage of the cover being formed from a continuous succession of color digital photographic images of discrete landscape features of the actual forest, the images being scanned by a computer and transferred to the material using a dye sublimation process.

In one approach, the images and actual colors of the digital images are applied such as by a spray onto a donor or transfer sheet, the transfer sheets being assembled atop the material and heated, transferring the completed images onto the material.

Advantageously, according to this invention, the camouflage is not formed by a random array of greens, blacks and browns but from true digital images that replicate the actual environment as would be seen by an observer looking at the blind and thus the blind more effectively blends into the environment.

Further, an advantage of this invention is the replication of an actual eco-scene or landscape, such as would be normally seen by animals frequenting the area.

The present invention will be more clearly understood with reference to the accompanying drawings and to the following Detailed Description, in which like reference numerals refer to like parts and wherein:

BRIEF DESCRIPTION OF THE DRAWINGS

FIG. 1 is a view of an outdoor area in which a user wishes to place a hunting blind provided with a camouflage in the form of an actual eco-scene to enable the blind to blend into the environment;

FIG. 3 is a view of the outdoor area of FIG. 1 and a hunting blind provided with the photographic image of the eco-scene taken in FIG. 2.

DETAILED DESCRIPTION OF THE PREFERRED EMBODIMENT

Figure 2:
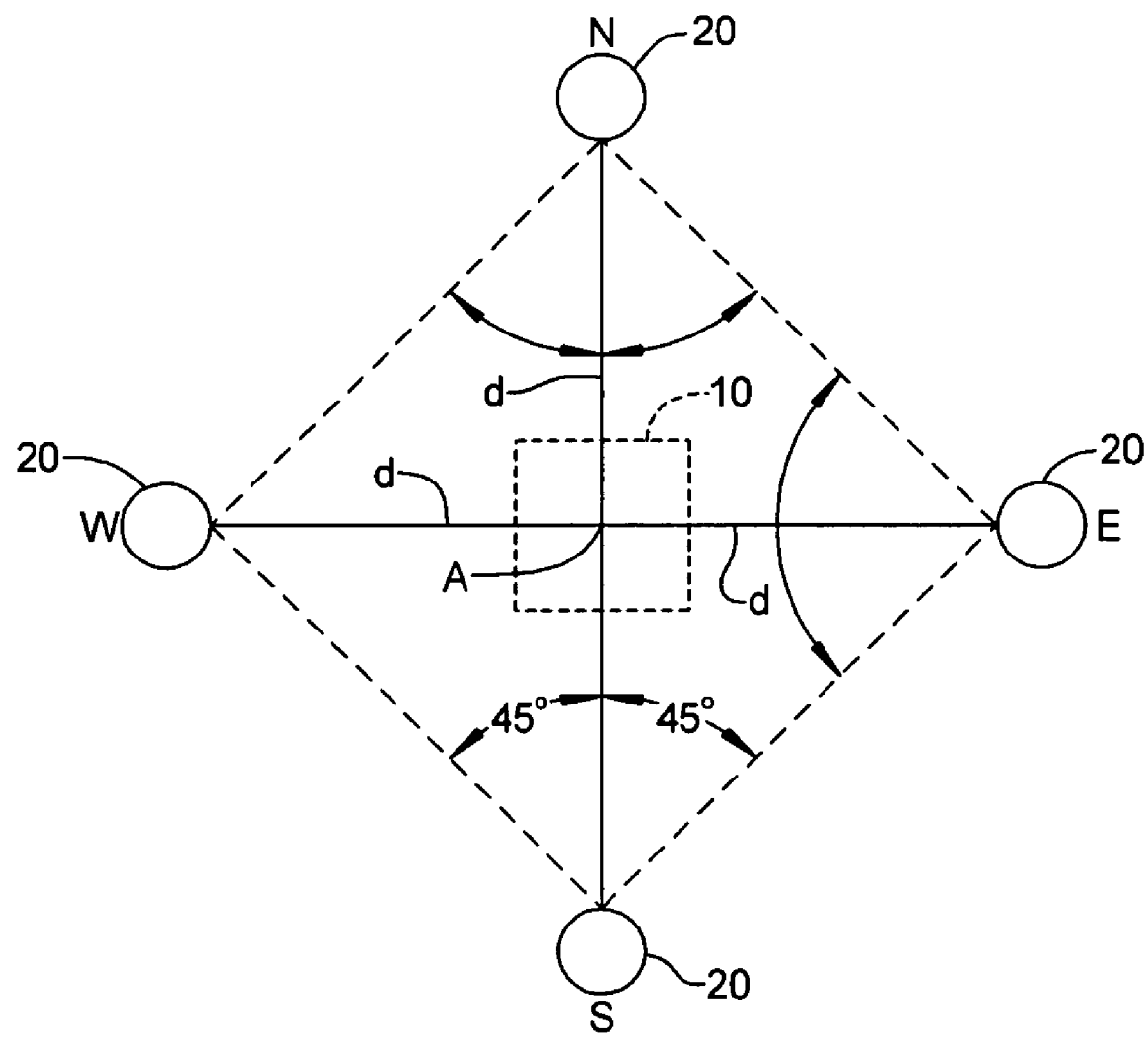
FIG. 2 is a plan view showing a step in acquiring a panoramic photographic image of the eco-scene of FIG. 1 to be placed on the hunting blind.

Turning now to the drawings, FIG. 1 is a photograph of a portion of a forest, seen looking in one direction, of a location where a hunter wishes to place a camouflage enclosure according to this invention. The camouflage enclosure is used where concealment is desired, such as by hunters when hunting deer, fowl and the like, but also by nature observers and in military operations.

Although oftentimes referred to as a "blind", it is to be understood that the term "blind" as used herein is to be construed broadly as any portable or fixed, hard sided or soft sided structure used for the purposes of concealment. For example, in military applications, the enclosure may be referred to as a tent.

According to this invention, and discussed herein below, the blind is provided with "camouflage" in the form of a panoramic photographic image of the actual location where the blind is to be located, and uses digital photography and a dye-sublimation process to generate and affix, in sequence, each of a succession of photographs of a particular environment onto one or more fabric panels that form the blind whereby the sequence of the photographs generate a 360° continuous panoramic view or realistic pattern that replicates the actual outdoor environment in which the blind is placed. The photographs are a replication of the actual trees, bushes, and like foliage of the setting in which the blind is to be placed and form a camouflage.

Importantly, and as used herein, the term camouflage enclosure or blind broadly includes a portable or fixed, hard sided or soft-sided structure for the purpose of concealment.

Although the enclosure or blind may take many shapes, depending on the application, according to this invention, a blind or tent 10 according to this invention is generally rectangular in shape and comprises an erectable knockdown skeletal frame, and a camouflage cover 12, which is mounted atop the frame. The frame is not shown as being understood by one skilled in the art but typically includes beams that assemble to one another to form a desired shape and which might include a roof. Preferably, the frame enables rapid set-up and knock down of the blind where desired by the user.

The camouflage cover 12 may be one piece or comprised of a series of panels or pieces that are joined to form the shape of the blind and is supported interiorly by the frame. In the embodiment illustrated in FIG. 3, the blind 10 generally has four vertical flat wall panels 14, at least one with an opening 15 that is coverable by a flap 16, and four flat roof panels 18 that angle upwardly and form a pyramid shaped dome. In general, the panels are attached to one another into the desired shape.

The cover 12 is comprised of a suitable material amenable to a dye sublimation process wherein dye from the sublimation process is impregnated into the fabric. Suitable materials are a polyester fabric, a polymer, a polymer-coated item, including natural fibers such as cotton and cotton blend fabrics, and materials having pores, such as canvas. Also suitable are the moisture wicking fabrics, such as CoolMax, EvapR8, Dri-Loc, and Dri-Fit, Soft L'ink, which is a specially formulated fabric for dye sublimation that is 100% cotton inside and 100% poly outside Polyester satin, Neoprene, Nylon, and Taslon, and plastic products that can withstand the heat, such as certain vinyl, such as those used on signage, and fiberglass reinforced plastic.

Further, the finished material is coated so as to be water repellant and resistant to environmental attack.

Additionally, the process can be applied to such fabrics as but not limited to see-through materials, screens, panels, sticky panels/decals, or any fabric.

Turning to FIG. 2, and according to this invention, the location "A" of the blind 10 is determined. A photographer moves back a predetermined distance "d" from the reference location "A" and uses a digital camera 20 to take a photograph of the actual forest or eco-scene as seen by the observer, taking photos looking at the reference "A" and therearound, such as along the North, South, East, and West compass coordinate axes.

This "photograph" typically comprises a great many pictures, such as resulting from the camera scanning the image (from left to right, and then from top to bottom) and taking a plurality of parallel and horizontally overlapped rows of pictures with each row having corresponding successions of overlapped pictures in side-by-side relation. Depending on the blind geometry, the "camouflage" scene desired, and the distance from the blind location, the camera may scan 45° each side of dead center.

Computer software is used to interpolate the final image where the component images are not in precise alignment.

The pictures from the digital camera are fed into a computer processor and a composite wall panel image is formed. The greater the number of overlapped pictures, the more likely that adjoined pictures will join to form a smooth transition without the need for retouching. Often the adjoining areas of the component images are matched for color, contrast and brightness to avoid the stitched parts being easily noticeable due to otherwise easily visible variations between the images. In this regard, computer graphic software is available to accomplish this "smoothing" task. Example programs include Hugin, Panorama Tools, Photostitch, and CleVR.

The process of combining multiple images to produce a panorama or larger image is known and will be described in general herein. Computer software is often used to interpolate the final image where the component images are not in precise alignment. This is usually done in three stages. First the computer analyzes the translation and rotation between any two sequencing images. Then the computer stabilizes the images so that every two images differentiate from each other only in their horizontal component. In the last stage a panorama image is stitched from the images. The stitching can be done by combining strips from each image.

The resulting image is then "applied" to the blind material. Preferably and according to this invention, the transfer techniques utilizes a method known in the art as dye sublimation.

In dye sublimation printing, a digital image is first produced through the use of computer graphic software. Then this image is printed onto a coated media or sheet using a set of special heat-activated inks. Finally, the image is then transferred to the final product using heat transfer equipment.

When heat is applied to the printed coated sheet, the ink sublimates (is absorbed) into the surface of the blind material (i.e., the final product). In dye sublimation, solid dye particles are changed into gas using heat and pressure, the gas then bonds with any polymer(s) present, and change back into a solid. Oftentimes, the dye particles that are used for this type of dye sublimation are designed to only bond with polymers, so the higher the polyester content in the material the more dye that will bond giving a brighter image. Other materials may be employed if prepared with a coating or a special layer of polymer for the dyes to bond to. There are fabric enhancers, prep sheets, and sprays that can be added to non-polyester fabrics, which will add a layer of polyester to the material.

In an important aspect, the photographic image represents the colors and textures corresponding to the various landscape features of the actual habitat and is applied by dye sublimation.

Typically, the various side panels have the requisite eco-scene applied prior to the panels being attached to one another.

The four sides of the finished blind blend into the forest environment or eco-scene in which placed because a digital photographic color image of the actual environment, as seen by an observer looking at the blind, from any of four orthogonal directions, is printed onto the blind material. That is, as viewed by a spectator walking about and viewing the exterior of the blind, the photographs form a large composite three-dimensional pictorial representation of the actual environment.

The process of providing camouflage concealment, as described herein above, extends to two and three-dimensional applications. For example, according to this invention, the camouflage concealment or blind includes the provision of a personal (one person) blind, such as exemplified by a throw cover or blanket covering.

Additionally, the camouflage concealment process can also be applied to any other outdoor equipment that requires concealment, such as, but not limited to, buckets, bucket covers, thermos bottles, lunch boxes, coolers, flashlights, soft sided blinds, hard sided blinds, portable seating, back packs, duffle bags, decoy bags, weapons, weapon cases, vehicles, vehicle covers, camouflage screens, tree stand skirts, boats, boat covers, dog clothing/covers, and all military equipment or military positions that require concealment.

While the present invention has been described with respect to specific embodiments, it will be understood that from the foregoing detailed description and accompanying drawings that various modifications and variations will occur to those skilled in the art. Such modifications and variations are intended to fall within the scope of the appended claims.

Having, thus, described the invention, what is claimed is:

1. A method of manufacturing a camouflaged hunting blind adapted to be located in a predetermined outdoor environment, comprising the steps of: (a) digitally photographing said outdoor environment, the photographs forming a continuous 360° panoramic view about the location where the blind is to be located and of the actual environment thereabout, (b) entering the photographs into a digital computer to create a set of digital images, and (c) printing the digital images onto at least one sheet of material in a manner to form a continuous-tone panoramic image;

wherein the images have the quality of photographic film and replicate the outdoor environment; and further wherein the step of photographing includes identifying a reference location of where the blind is to be placed, and from each of a succession of locations spaced from and around the reference location, taking at least one photograph looking at the reference location from the succession of locations to form a set of digital component images.

2. The method of claim 1, wherein said outdoor environment comprises an eco-scene of trees, bushes, underbrush, cornfields, cat tails, and outdoor foliage.

3. The method of claim 1, further comprising:

combining the set of digital images with the computer in precise alignment and interpolating successive of the separate component images into the final continuous tone panoramic image, and wherein the outdoor environment is representative of an eco-scene.

4. The method of claim 3, wherein the dye sublimation process includes spraying the actual images and colors onto at least one transfer sheet, the at least one transfer sheet being assembled atop the material, heating the sheet and transferring the completed images onto the material.

5. The method of claim 1, wherein the step of printing is by a dye sublimation process, the material is a polyester fabric and the dye from the sublimation process is impregnated into the material of the fabric.

6. The method of claim 5, wherein the finished dye printed material is a coated material which is water repellant and resistant to environmental attack.

7. The method of claim 1, wherein the material is selected from the group consisting of a polyester fabric, a polymer, a polymer-coated item, cotton, cotton blend fabrics, and porous materials.

8. The method of claim 7, wherein the material is canvas.

* * * * *